April 8, 1941.  J. P. BADENHAUSEN  2,238,007
CHEMICAL RECOVERY FURNACE AND METHOD OF CHEMICAL RECOVERY
Filed March 22, 1938  2 Sheets-Sheet 1

Inventor:
John Phillips Badenhausen,
By Z. T. Wobensmith 2nd
Attorney.

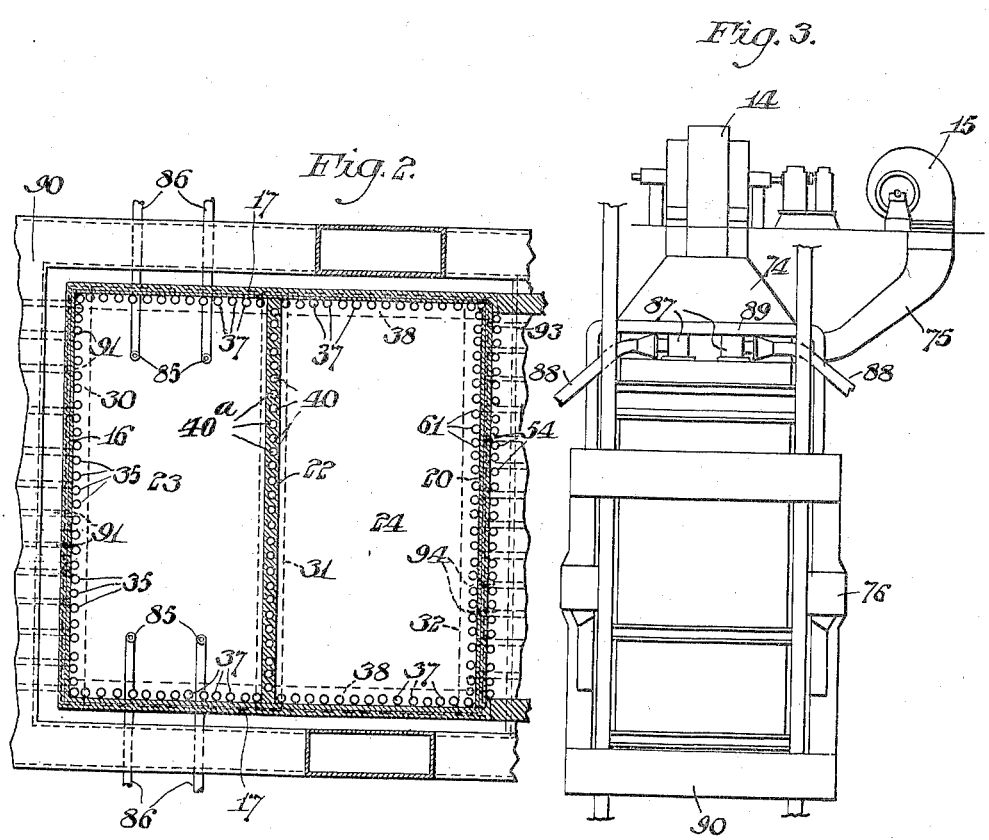

Patented Apr. 8, 1941

2,238,007

UNITED STATES PATENT OFFICE 2,238,007

CHEMICAL RECOVERY FURNACE AND METHOD OF CHEMICAL RECOVERY

John Phillips Badenhausen, Philadelphia, Pa., assignor of one-half to Day and Zimmermann, Incorporated, Philadelphia, Pa., a corporation of Maryland Application March 22, 1938, Serial No. 197,496

8 Claims. (Cl. 23—48)

This invention relates to chemical recovery furnaces and methods of operating the same and relates more particularly to furnaces in which combustible materials are introduced for chemical recovery and for combustion.

The invention further relates to apparatus and processes for the recovery of chemicals from waste liquors derived from industrial plants in the alcohol, sugar and paper industries, and the utilization in the recovery of the available heat of the combustibles in the waste liquor.

The invention further relates to improved methods of burning the combustible material contained in waste liquor from paper pulp mills, sugar refineries, distilleries and the like, to improved methods of recovery of chemicals therein, and to the generation of steam by the heat released by the combustion.

With the furnaces heretofore available, as well as with the methods heretofore employed in the treatment of waste liquors of the character heretofore referred to, many of the furnaces were restricted in the capacities for which they could be built, or if designed for a particular capacity permitted large portions of the chemicals to be carried beyond the furnace.

It is an object of the present invention, therefore, to provide a furnace construction and methods of operation thereof, particularly suitable for the chemical recovery and combustion and which will overcome the difficulties heretofore encountered.

It is a further object of the present invention to provide a furnace construction and methods of chemical recovery in which a plurality of combustible materials may be utilized.

It is a further object of the present invention to provide a furnace construction for chemical recovery and combustion in which the rating may be varied over a wide range.

It is a further object of the present invention to provide an improved process and apparatus for treating waste liquids from industrial processes so that a high yield of recovered chemicals will be obtained.

It is a further object of the present invention to provide an improved apparatus for combustion of the combustible constituents of molasses refuse from sugar refineries, the waste liquors from distilleries, black liquor and other waste liquors from paper pulp mills, bark obtained from the logs used for making paper pulp, as well as other materials, these materials being used alone or in combination as herein indicated.

It is a further object of the present invention to provide a furnace construction in which a plurality of different materials having combustible constituents may be utilized.

It is a further object of the present invention to utilize a portion of the heat available from chemical recovery and combustion incident thereto for steam generation.

Other objects of the invention will appear from the annexed specification and claims.

The nature and characteristic features of the invention will be more readily understood from the following description taken in connection with the accompanying drawings forming part hereof, in which:

Fig. 2 is a horizontal sectional view taken approximately on the line 2—2 of Fig. 1; and Fig. 3 is a front elevational view of the apparatus.

Figure 1:
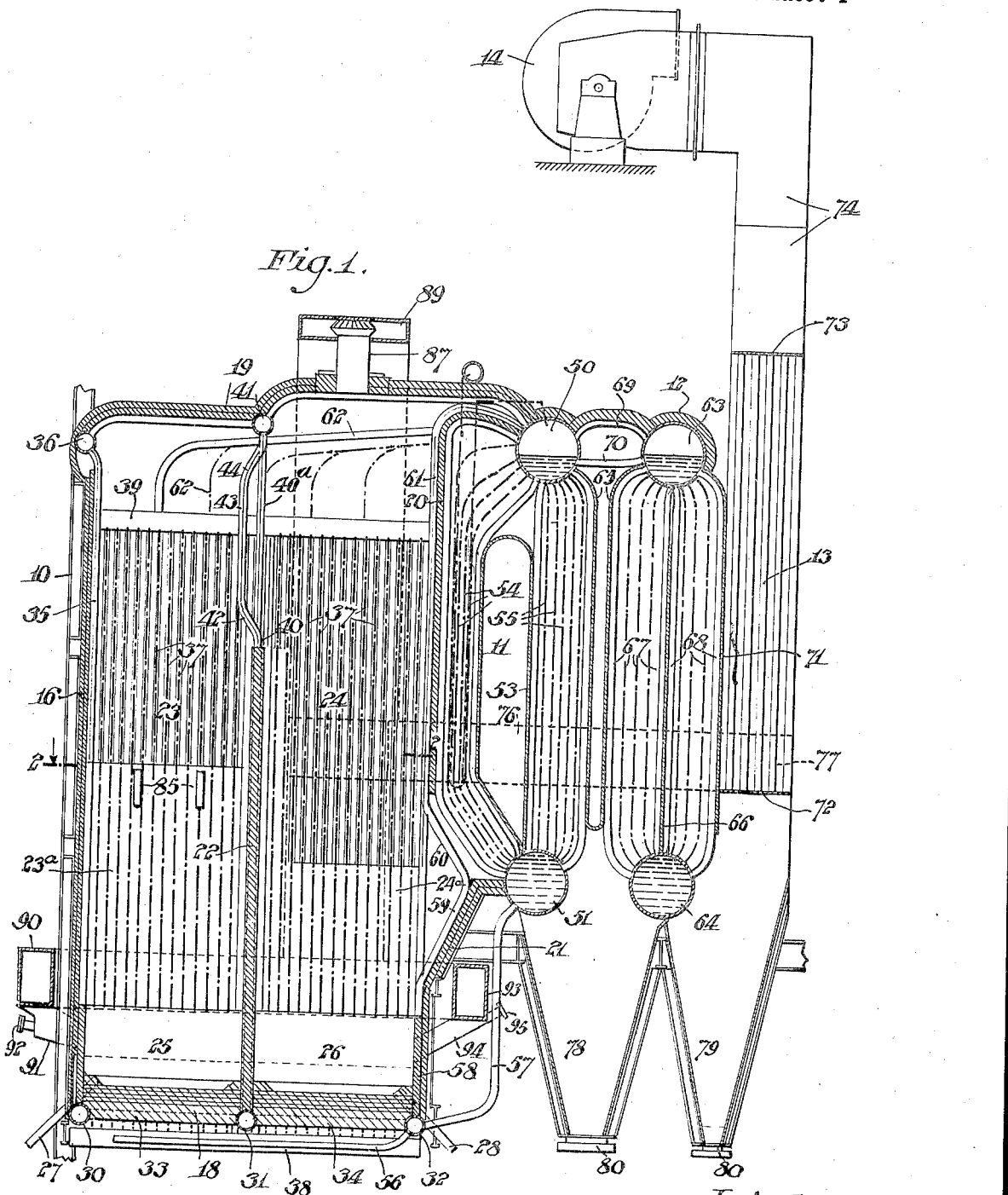
Figure 1 is a vertical central sectional view taken from the front to the back of a preferred embodiment of the apparatus of the present invention.

It will, of course, be understood that the description and drawings herein contained are illustrative merely, and that various modifications and changes may be made in the structure disclosed without departing from the spirit of the invention.

Referring more particularly to the drawings it will be seen that there is provided a furnace section 10 having steam generating tubes in and along the walls thereof, as hereinafter more fully referred to, a boiler and superheater section 11, an economizer section 12, an air preheater 13, an induced draft fan 14 for the withdrawal of products of combustion, a forced draft fan 15 for supplying preheated air to the furnace section 10, and devices for introducing the waste liquors and other combustible materials into the furnace chamber. The furnace section 10 is preferably composed of a front wall 16, side walls 17, a bottom wall 18, a top wall 19 and rear wall portions 20 and 21, all of which may be provided with steam generating surfaces therein or therealong.

The specific form of heat absorbing and steam generating surfaces are merely illustrative and may be modified in many particulars.

The furnace section 10 is preferably divided centrally by a wall or baffle 22 which extends from the bottom thereof to a location spaced from the top wall 19 to provide within the furnace section 10 an upward pass 23 and a downward pass 24. The walls of the upward pass 23 and the downward pass 24 may have portions thereof provided with refractory coverings 23a and 24ᵃ which are particularly resistant to the chemicals recovered in the furnace section.

The floor 18 is preferably formed as a hearth and is separated by the wall or baffle 22 into two collecting spaces or sections 25 and 26. Suitable refractory material is provided at the bottom of these sections and is extended upwardly along the sides of each of these sections, so that the recovered chemicals may be collected therein for withdrawal. The collecting space or floor section 25 is provided with suitable spouts 27 for withdrawal of chemicals therefrom, and the collecting space or floor section 26 is likewise provided with spouts 28, for the same purpose. The floor 18 preferably has provided therein at the front a transverse lower header 30, at the center a transverse lower header 31, and at the rear a transverse lower header 32.

A bank of tubes 33 is provided for connecting the lower header 30 to the lower header 31 and another bank of tubes 34 is provided for connecting the lower header 31 to the lower header 32.

The front wall 16 is preferably provided with a suitable bank of steam generating tubes 35 which extend from the lower header 30 in the floor 18, through the refractory material of the collecting section 25 and to an upper header 36 at the top wall 19. The side walls 17 are also preferably provided with suitable banks of steam generating tubes 37 which extend from the lower headers 38, through the refractory material of the collecting sections 25 and 26, and to upper headers 39.

The baffle or wall 22 which divides the furnace into two passes 23 and 24 preferably has provided therein banks of tubes 40 and alternating therewith banks of tubes 40ᵃ which extend from the lower header 31 in the bottom wall 18 of the furnace section 10 to an upper header 41 in the top wall 19. The bank of tubes 40 has portions 42 bent outwardly, portions 43 extending vertically and inclined portions 44 which are connected to the header 41. The bank of tubes 40ᵃ are straight tubes. The banks of tubes 40 and 40ᵃ are provided to reduce the temperature of the baffle or wall 22 to within safe limits, for steam generation by the heat available at this portion of the furnace and so that the upper portions of the tubes may reduce the quantity of material carried with the stream of gases from the upward pass 23 to the downward pass 24.

The boiler section 11 which is located to the rear of the furnace section 10 preferably includes an upper transverse steam-and-water drum 50 and therebelow a lower transverse water drum 51. The rear wall 20 of the furnace section 10 preferably extends from the steam-and-water drum 50 forwardly and downwardly. A baffle 53 which extends upwardly from the lower drum 51 separates the boiler section 11 into an upward pass and a downward pass. The upward pass is provided with a suitable bank of tubes 54 extending from the lower drum 51 to the upper drum 50 and the downward pass is provided with a suitable bank of tubes 55 also extending from the lower drum 51 to the upper drum 50.

The rear portion of the furnace section 10 at the bottom thereof has the lower header 32 which is connected by a bank of tubes 56 to the lower headers 38 of the side walls 17 and by another bank of tubes 57 to the water drum 51 of the boiler section 11.

The lower rear wall portion 21 is provided for closing the space between the lower header 32 and the water drum 51 and includes a vertically disposed portion and a rearwardly inclined portion. A bank of tubes 58 is provided which extends upwardly along the vertical portion, has portions 59 inclined along the inclined portion of the wall 21, has forwardly disposed portions 60 for reducing the quantity of material carried with the stream of gases into the boiler section 11, has portions 61 which extend along the side of the wall or baffle 20 which is within the furnace section 10, and are connected to the steam-and-water drum 50.

The upper headers 39 of the side walls 17 are also connected by a suitable bank of tubes 62 to the steam-and-water drum 50.

The economizer section 12, which is located to the rear of the boiler section 11 preferably includes an upper transverse steam-and-water drum 63 and therebelow a lower transverse water drum 64. A baffle 65 is provided to separate the economizer section 12 from the boiler section 11 and a baffle 66 is provided which extends upwardly from the lower drum 64 to divide the economizer 12 into an upward pass and a downward pass. A bank of tubes 67 is provided between the lower drum 64 and the upper drum 63 in the upward pass and a bank of tubes 68 is provided between the drum 64 and the drum 63 in the downward pass. A bank of tubes 69 is provided for connecting the steam space of the drum 50 of the boiler section 11 to the steam space of the drum 63 of the economizer section 12 and a bank of tubes 70 is provided between these drums below the water levels therein.

The air preheater 13 which is located to the rear of the economizer section 12 is separated therefrom by a wall 71, has a gas inlet 72 in communication with the outlet of the economizer section 12 and has a gas outlet 73 connected by a suitable duct 74 to the induced draft fan 14. The induced draft fan 14 is connected to the stack (not shown). The forced draft fan 15 for the air preheater 13 is connected by a suitable duct 75 to the air inlet so that air under pressure may be supplied to the air preheater 13, preheated therein by the heat in the combustion gases and delivered therefrom to the furnace section 10 by means of a duct 76 connected to the air outlet 77 of the preheater 13.

A collecting chamber 78 is provided between and below the boiler section 11 and the economizer section 12 and a collecting chamber 79 is provided between and below the economizer section 12 and the air heater 13 for collecting any chemicals which may be carried over from the furnace section 10. The lower portions of the collecting chambers 78 and 79 are closed by suitable removable gates 80 so that chemicals depositing therein may be removed without interfering with the operation of the system.

In accordance with the present invention provision is made for delivery into the furnace section of the combustible material. The combustible material may be waste or black liquor from paper pulp mills, molasses residues from sugar refineries, the waste liquids from distilleries, and like materials. These liquors contain, in addition to the chemicals therein which it is desired to recover, combustible organic material and combustible inorganic material which may be burned under the proper conditions, and usually also contain water of a quantity which may make combustion difficult. The liquor is therefore preferably concentrated to reduce the water content and after concentration is introduced into the furnace section 10 for dehydration, combustion of the combustible constituents, recovery of the chemicals and utilization of the heat released by the combustion. For this purpose the upward pass 23 of the furnace section 10 preferably has mounted in the lower part of each of the side walls 17 thereof, a plurality of upwardly directed nozzles 85 which are supplied with liquor by the supply pipes 86 and located to deliver the liquor introduced therethrough in a coarse spray upwardly into the upper part of the upward pass 23 and in the direction of the advancing stream of gases in the furnace section 10.

The nozzles 85 are preferably located below the middle of the upward pass 23 and the sprayed material is delivered into the upper portion of the upward pass 23, for dehydration and combustion as hereinafter more fully referred to.

The top wall 19 of the furnace 10 preferably has mounted therein and substantially centrally above the downward pass 24 a plurality of nozzles 87 to which supply pipes 88 are connected, which may be utilized for introducing downwardly into the downward pass 24 oil, shredded or comminuted bark, or pulverized coal under certain conditions of operation where the supply of liquor is reduced below that for which the furnace section is designed.

The provision of nozzles 87 permits of the continuous generation of steam and the operation of the chemical recovery process with reduced quantities of liquor, or if it is necessary to discontinue the chemical recovery the generation of steam may be continuously effected. The nozzles 87 have in conjunction therewith suitable air ducts 89 for supplying air with the fuel introduced through the nozzles 87 sufficient for the combustion of the combustible material introduced through the nozzles 87.

Suitable provision is also made for supplying air to the furnace section 10 for the combustion therein of the combustibles in the liquor and for this purpose a duct 90 is employed, the duct 90 having a plurality of branch ducts 91, provided with suitable air controlling valves 92, connected thereto and leading through the front wall 16 into the lower portion of the upward pass 23 at the collecting section 25. A duct 93 is also provided at the lower end of the downward pass 24 and suitable branch ducts 94, provided with suitable air controlling valves 95, extend therefrom through the rear wall 21 of the furnace section 10 at the collecting section 26. Air preheated by the preheater is supplied to the duct 89, and to the ducts 90 and 93, by the duct 76.

The mode of operation of the structure herein disclosed and the methods for recovering chemicals and waste heat will now be set forth.

Before the system is continuously operated, it is necessary that the furnace section 10 be preheated and brought to a temperature such that the operation will be self sustaining and continuous, in the furnace section 10, and such that recovery of the chemicals may be effected. The waste liquor, which has been previously concentrated, is supplied by the nozzles 85 in a coarse spray into the upward pass 23 of the furnace section 10.

The preheated air from the preheater 13 which is supplied to the lower portion of the upward pass 23 of the furnace section 10 through the duct 90, and the smaller ducts 91 also moves upwardly in the upward pass 23. The quantity of air supplied at the lower portion of the upward pass 23 may be regulated as desired by the control dampers 92 to provide and maintain the desired quantity within the upward pass 23 of the furnace section 10. The dehydration and combustion of combustible constituents in the waste liquor commences immediately upon the introduction of the spray so that a long flame is provided which substantially fills the upward pass 23, extends over the top of the baffle or wall 22, extends downwardly and substantially fills the downward pass 24 and may extend for a short distance into the upward pass of the boiler section 11.

Upon dehydration and combustion, the chemicals to be recovered, by reason of their being freed of their combustible constituents, their volatile constituents, and the water content, will fall in molten state to the floor 18, and any small portions of combustible constituents carried down therewith will be promptly burned out. Portions of the chemicals separating out in the upward pass 23 will fall downwardly therein and collect in the collecting space or section 25, and other portions of the chemicals separating out will collect at the collecting space or floor section 26 at the bottom of the downward pass 24.

The preheated air supplied by the duct 93, and the branch ducts 94 to the floor section 26 will assist in completing the combustion of any unconsumed combustibles which reach this portion of the furnace section. The inclined portions 60 of the bank of tubes 58 prevent the carrying over into the boiler section 11 of chemicals entrained in the stream of combustion gases and deflect these chemicals back toward the floor section 26.

The products of combustion from the furnace section 10 pass successively through the boiler section 11 and the economizer section 12 and give up heat for steam generation to the banks of tubes 54, 55, 67 and 68 in these sections and then pass through the air preheater 13 where further quantities of heat are given up for preheating the air supplied to the furnace section 10.

The effective shape of the furnace section 10 and the path therein of the advancing gases as well as the portions 42 and 43 of the tubes 40 which extend into the upward pass 23 provide sufficient turbulence within the furnace section 10 so that particles of unconsumed combustible material are brought into intimate contact with the air introduced into the furnace section 10.

While the greater portion of the chemicals, in molten form and substantially free from combustible materials deposit on the floor sections 25 and 26 for withdrawal through the spouts 27 and 28, any small quantities of chemicals which are carried beyond the furnace section 10 are thrown down by the cooling of the gases. Withdrawal from the collecting chambers 78 and 79 of chemicals depositing therein may be effected without interfering with the continuous operation of the system.

In the ordinary operation of the furnace, with the waste liquor supplied through the nozzles 85, it will not be necessary to introduce any fuel through the nozzles 87 in the top wall 19.

If the supply of waste liquor should fall below that required for the most effective operation of the furnace section for the recovery of chemicals, the continuity of recovery and the continuation of steam generation may be effected by introducing fuel through the nozzles 87. The fuel used, however, should preferably be of a character which will, upon combustion, leave little or no residue and which will not interfere with the recovery of the chemicals.

I claim:

1. A waste heat and chemical recovery furnace for the treatment of waste liquid containing combustible constituents and chemicals to be recovered comprising a furnace chamber, said chamber having a vertical wall dividing said furnace chamber into two passes, means in the lower part of said chamber for introducing waste liquid into the first of said passes for dehydration and combustion of the combustible constituents while in said furnace chamber, means for supplying air for combustion to said furnace chamber at the lower portions of each of said passes, and means for collecting for withdrawal the chemicals separating out from the waste liquid during the combustion of the combustible constituents.

2. A waste heat and chemical recovery furnace for the treatment of waste liquid containing combustible constituents and chemicals to be recovered comprising a furnace chamber, said chamber having a vertical wall extending upwardly at the central part thereof and dividing said furnace chamber into an upward pass and a downward pass, means in the lower portion of the chamber for spraying waste liquid upwardly within said upward pass, auxiliary fuel inlet devices in one of said walls for spraying auxiliary fuel downwardly into said furnace chamber, means for supplying air to said furnace chamber at the lower portions of each of said passes, and means at the bottom of each of said passes for collecting for withdrawal the chemicals separating out from the waste liquid.

3. A waste heat and chemical recovery furnace for the treatment of waste liquid containing combustible constituents and chemicals to be recovered comprising a furnace chamber, the walls of said furnace chamber being lined with water tubes for absorbing heat from the combustion in said chamber, said chamber having a vertical wall extending upwardly at the central part thereof and dividing said furnace chamber into an upward pass and a downward pass, means in the lower portion of the furnace chamber for spraying waste liquid upwardly within said upward pass, auxiliary fuel inlet devices in the top wall of said furnace chamber for spraying fuel downwardly into the downward pass of said furnace chamber, means for supplying air to said furnace chamber at the lower portions of each of said passes, and means at the bottom of each of said passes for collecting for withdrawal the chemicals separating out from the waste liquid.

4. A process for recovering heat and chemicals from waste liquid containing combustible constituents and chemicals to be recovered which includes supplying the liquid in an upwardly directed spray for dehydration and initiation of combustion of the combustible constituents, supplying air for combustion from beneath the spray, collecting portions of the recoverable chemicals therebelow, directing the burning fluent materials downwardly, supplying air thereto at the bottom of the downward path, and collecting additional portions of recoverable chemicals therebelow.

5. A process for recovering heat and chemicals from waste liquid containing combustible constituents and chemicals to be recovered which includes supplying the liquid in an upwardly directed spray for dehydration and initiation of combustion of the combustible constituents, supplying air for combustion from beneath the spray, collecting portions of the recoverable chemicals therebelow, directing the burning fluent materials downwardly, supplying air thereto at the bottom of the downward path, collecting additional portions of recoverable chemicals therebelow, withdrawing heat available as radiant heat from the combustion, and withdrawing additional heat from the gases after the combustion of the combustibles.

6. A process for recovering heat and chemicals from waste liquid containing combustible constituents and chemicals to be recovered which comprises supplying the liquid in an upwardly directed spray for dehydration and initiation of combustion of the combustible constituents thereof, supplying air for combustion from beneath the spray, collecting portions of the recoverable chemicals therebelow, utilizing a portion of the air so supplied for combustion of combustible residues in the collected chemicals, directing the burning fluent materials from the combustion of the sprayed liquor downwardly, collecting additional portions of recoverable chemicals therebelow, supplying air at the bottom of the downward path for combustion of combustible residues in the collected chemicals and of the unconsumed combustibles in the advancing stream, withdrawing heat available as radiant heat from the combustion, and withdrawing additional heat from the gases after the combustion of the combustibles.

7. A process for recovering heat and chemicals from waste liquid containing combustible constituents and chemicals to be recovered which comprises supplying the liquid in an upwardly directed spray for dehydration and initiation of combustion of the combustible constituents thereof, supplying air for combustion from beneath the spray, collecting portions of the recoverable chemicals therebelow, utilizing a portion of the air so supplied for combustion of combustible residues in the collected chemicals and smelting of the collected chemicals, directing the burning fluent materials from the combustion of the sprayed liquor downwardly, collecting additional portions of recoverable chemicals therebelow, supplying air at the bottom of the downward path for combustion of combustible residues in the collected chemicals and of the unconsumed combustibles in the advancing stream and for smelting of the collected chemicals, withdrawing heat available as radiant heat from the combustion, and withdrawing additional heat from the gases after the combustion of the combustibles.

8. A waste heat and chemical recovery furnace for the treatment of waste liquid containing combustible constituents and chemicals to be recovered including a furnace chamber divided into a plurality of sections, means intermediate the top and bottom of the first section for supplying waste liquid to said section for combustion of the combustible constituents in said chamber, means for supplying air to the first section at the lower part thereof, auxiliary fuel inlet devices in one of the walls of the furnace for supplying auxiliary fuel to another section of said furnace chamber, means for supplying air to said other section, means for collecting for withdrawal chemicals separating from the waste liquid, and means for generating steam by the heat from the combustion, said means including tubes in the walls of said furnace chamber.

JOHN PHILLIPS BADENHAUSEN.